United States Patent [19]

Trautmann

[11] Patent Number: 4,622,874

[45] Date of Patent: Nov. 18, 1986

[54] MEANS FOR ATTACHING A TOOL RECEIVING SLEEVE TO A CONCAVE SLIDE OF A MACHINE TOOL

[75] Inventor: Günther Trautmann, Kirchheim-Nabern, Fed. Rep. of Germany

[73] Assignee: Index-Werke Komm.-Ges. Hahn & Tessky, Fed. Rep. of Germany

[21] Appl. No.: 662,040

[22] Filed: Oct. 18, 1984

[30] Foreign Application Priority Data

Nov. 5, 1983 [DE] Fed. Rep. of Germany ....... 3340102

[51] Int. Cl.[4] .................. B23B 21/00; B23B 29/00
[52] U.S. Cl. .................. 82/24 R; 82/36 R; 403/234; 403/235; 403/344
[58] Field of Search ............ 82/36 R, 36 A, 24 R, 82/2 R, 3, 32; 408/92, 104; 409/241; 403/344, 234, 235

[56] References Cited

U.S. PATENT DOCUMENTS 4,215,961 8/1980 Babel .................... 409/241
4,275,625 6/1981 Tomlinson ................ 82/3

FOREIGN PATENT DOCUMENTS

WO83/01402 4/1983 PCT Int'l Appl. .......... 82/36 A

Primary Examiner—Leonidas Vlachos
Attorney, Agent, or Firm—Leydig, Voit & Mayer

[57] ABSTRACT

A clamping mechanism for mounting a tool holder or receiving sleeve having a cylindrical outer contour to a machine tool having a bed, the clamping mechanism comprising a slide mounted for sliding movement on the bed and having a concave surface for supporting the cylindrical outer contour of the tool holder sleeve, an apparatus for securing the slide on the bed, and a clamp assembly including a clamping bracket circumferentially spanning the tool holder sleeve, an arrangement for detachably securing the clamping bracket to the slide, and a threaded structure for tightening the clamping bracket around the tool holder sleeve.

8 Claims, 4 Drawing Figures

MEANS FOR ATTACHING A TOOL RECEIVING SLEEVE TO A CONCAVE SLIDE OF A MACHINE TOOL

The invention relates to means for attaching a sleeve receiving a tool holder, tool shank or the like to a so-called concave slide of a machine tool, i.e. a slide having a concave mounting surface.

Concave slides of this type which are common in multiple-spindle lathes have, when seen transversely to the direction of guidance, a cross section corresponding to part of a circular ring. The face having the smaller radius of curvature forms a concave support surface for a tool receiving sleeve and is provided with a plurality of threaded bores designed as blind holes. The tool receiving sleeve has through bores in its wall area which is to rest against the concave slide. These bores are arranged in accordance with the threaded bores. Fastening screws are inserted into the through bores from the interior of the sleeve in order to secure the sleeve to the concave slide. To enable these fastening screws to be tightened, the tool receiving sleeve has second through bores located diagonally opposite the first through bores. These second through bores are designed as threaded bores and may be sealed by plug screws. This known construction has a number of disadvantages. In order to mount the tool receiving sleeve on the concave slide or dismount it again, the tool receiving sleeve must be empty, i.e. the tool holders, drive spindles for driven tools and the like cannot be inserted into the sleeve until the tool receiving sleeve has been mounted on the concave slide. Prior to the sleeve being dismounted, the tool drive spindle, tool holder or the like must be removed. Practical experience has also shown that the interior of the tool receiving sleeve is not reliably sealed against cooling medium by the fastening and plug screws. Cooling medium penetrating into the interior of the tool receiving sleeve does, however, cause corrosion damage.

The object of the invention was therefore to provide a means for attaching a tool receiving sleeve to a concave slide, which enables a unit which is completely assembled, i.e. consists in a tool receiving sleeve as well as the parts held thereby, such as a tool drive spindle, tool holder or the like, to be mounted on a concave slide and dismounted therefrom. Accordingly, the present invention provides a clamping mechanism for mounting a tool holder sleeve having a cylindrical outer contour to a machine tool having a bed. The clamping mechanism comprises a slide mounted for sliding movement on the bed and having a concave surface for supporting the cylindrical outer contour of the tool holder sleeve, an apparatus for securing the slide on the bed, and a clamp assembly including a clamping bracket circumferentially spanning the tool holder sleeve, an arrangement for detachably securing the clamping bracket to the slide, and a threaded structure for tightening the clamping bracket around the tool holder sleeve. The invention therefore provides an attachment means similar to a pipe clamp or clip which does not require any through bores or other openings in the tool receiving sleeve. The tool receiving sleeve can therefore be mounted and dismounted when fully equipped and the risk of cooling medium penetrating into the interior of the tool receiving sleeve is eliminated. Furthermore, the tool receiving sleeve can be mounted on the concave slide in any axial and radial position, as required, since it is no longer necessary to take the pattern and position of threaded bores and through bores into account. The inventive solution also takes narrow space conditions into consideration and guarantees a favourable runoff of turnings or chips resulting from machining of a workpiece.

In order to ensure that the attachment of the tool receiving sleeve to the concave slide is absolutely reliable and rigid, clamping brackets are recommended which have an inner contour adapted to the outer contour of the tool receiving sleeve or are adjustable like a tension strap.

One end of the clamping bracket could be hinged to the concave slide and the other end tightened against the slide by means of a fastening screw. It is also possible to secure both ends of the clamping bracket to the concave slide by means of fastening screws. In any case, at least one of the fastening elements is a tightening screw mounted on one end of the clamping bracket while the corresponding anchoring element is designed as a threaded bore in the concave slide.

The clamping bracket may be anchored to the concave slide particularly quickly and easily when at least one of the fastening elements is designed as a hook adapted to be hooked onto a projection of the concave slide, the hook forming one end of the clamping bracket. The clamping bracket must then be provided at some spot with a tightening element, for example a tightening screw, so that it can be tightened down. A clamping bracket which is divided into parts, at least two of which may be drawn together by a tightening screw provided therebetween, may also be advantageous for different reasons, for example when the tightening screw is located in a predetermined place on the attachment means for reasons of accessibility.

Additional features, advantages and details of the invention are given in the attached claims and/or the attached drawings as well as the following description of several, particularly favourable embodiments of the inventive attachment means.

In the drawings,

FIG. 3 and FIG. 4 are cross sections corresponding to FIG. 2 through a second and a third embodiment.

Figure 1:
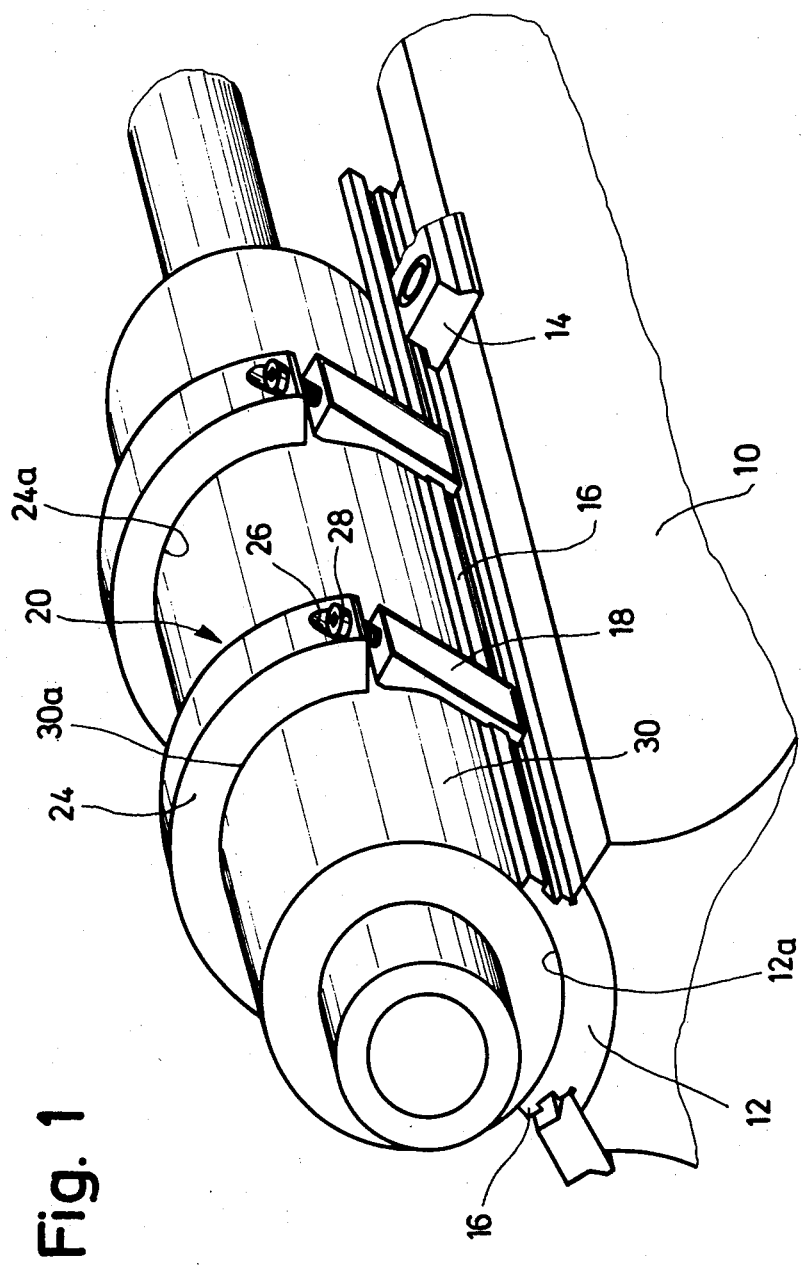
FIG. 1 is a perspective illustration of a first embodiment.
Figure 2:
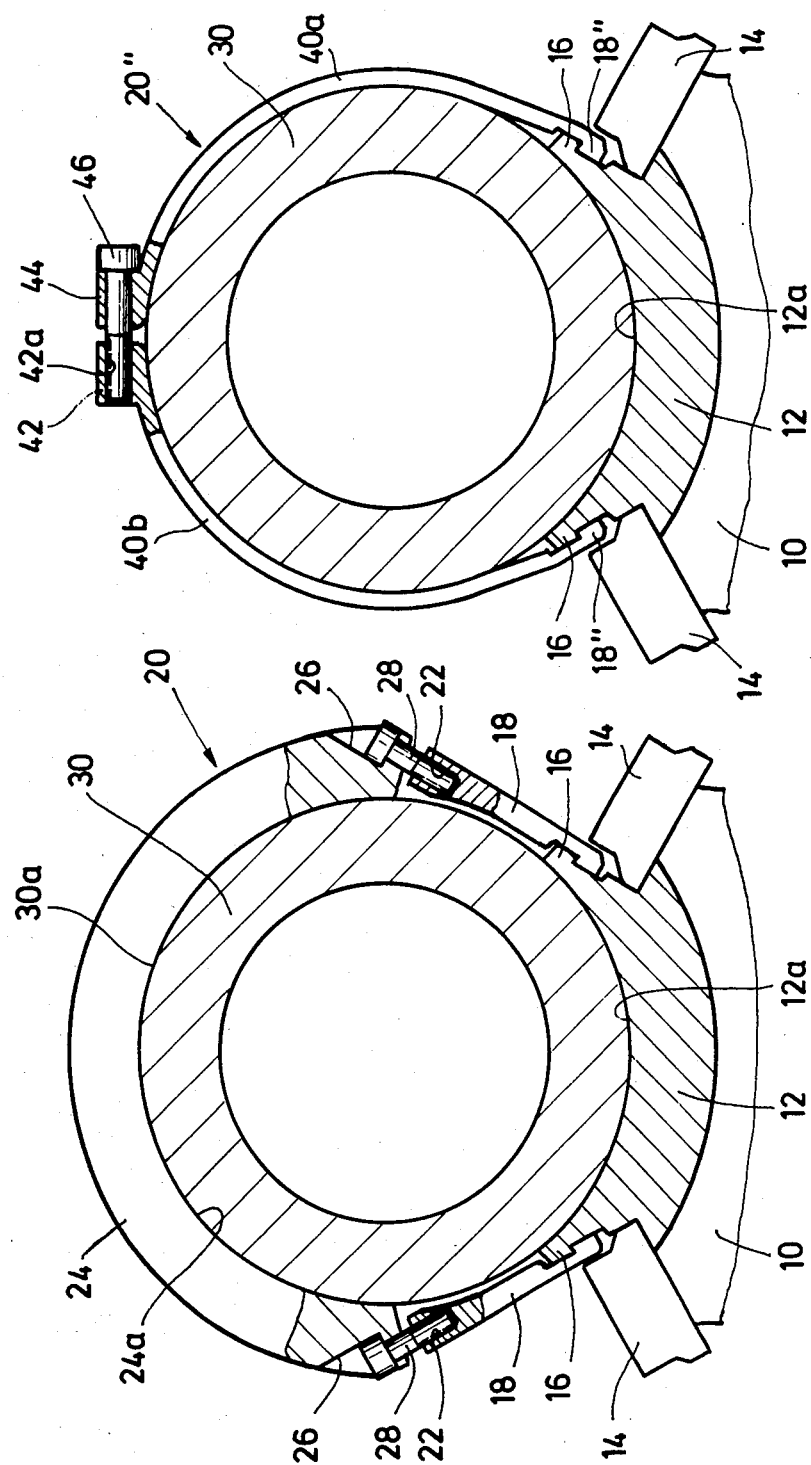
FIG. 2 is a cross section through the first embodiment.

FIGS. 1 and 2 show a guide bed 10 for a concave slide 12 which is displaceable along the guide bed at right angles to the plane of drawing of FIG. 2 and is held on the guide bed by retaining blocks 14 mounted on the guide bed 10. Along its longitudinal edges the concave slide 12 has batten-like anchoring noses 16, to which the hook parts 18 of a clamping bracket designated as a whole as 20 may be attached. These hook parts are provided with threaded bores 22 while a rigid fastening member 24 has stepped through bores 26 at its ends. The fastening member may therefore be drawn towards the concave slide 12 by tightening screws 28 and tightened against a tool receiving sleeve 30 which may be fitted onto a support surface 12a of the concave slide 12. In addition, the inner contour 24c of the fastening member 24 is adapted to the outer contour 30a of the tool receiving sleeve 30, all these contours thereby appropriately being parts of circular-cylindrical surfaces.

As shown in FIG. 1, a plurality of clamping brackets 20 is advantageously provided although it would also be conceivable to have a single clamping bracket which would then be correspondingly wider.

Figure 3:
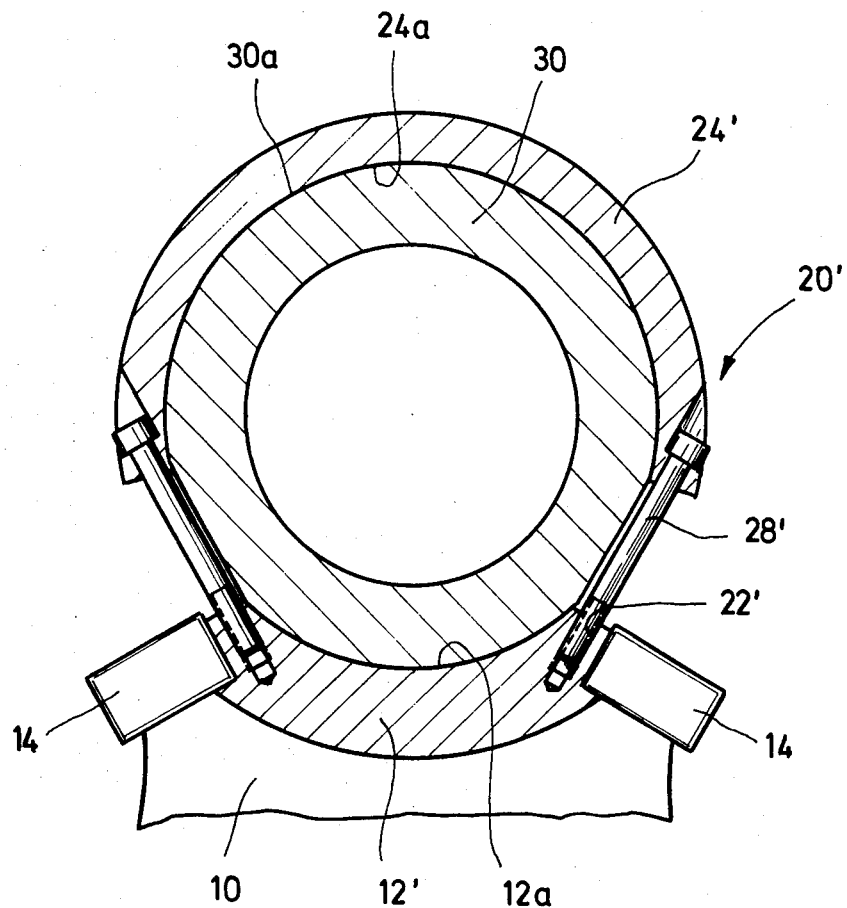

The embodiment according to FIG. 3 differs from that of FIGS. 1 and 2 only in that the anchoring elements on the concave slide have the form of threaded bores 22'. A fastening member 24' of a clamping bracket designated as a whole as 20' can therefore be mounted directly onto the concave slide 12' by means of tightening screws 28'. This embodiment does not have the hook parts 18 of the first embodiment, i.e. the clamping bracket 20' comprises only three parts, namely the fastening member 24' and two tightening screws 28'.

In the embodiment of FIG. 4, the clamping bracket 20" consists of a two-piece tension strap having parts 40a and 40b. Their lower ends form hooks 18" and so the concave slide 12 used can be the same as that of the embodiment according to FIGS. 1 and 2. The upper ends of the two tension straps form two abutments 42 and 44 for a tightening screw 46, a threaded bore 42a being provided in the abutment 42.

In the embodiments of FIGS. 3 and 4, it is of course possible to use a plurality of clamping brackets 20' or 20" situated one behind the other for mounting the tool receiving sleeve 30.

It is obvious that the tool receiving sleeve need not be circular-cylindrical in shape although this is normally the case.

What is claimed is:

1. A clamping mechanism for mounting a tool holder sleeve having a cylindrical outer contour to a machine tool having a bed, said clamping mechanism comprising a slide mounted for sliding movement on the bed and having a concave surface for supporting the cylindrical outer contour of the tool holder sleeve, means for securing the slide on the bed, and a clamp assembly including a clamping bracket circumferentially spanning the tool holder sleeve, means for detachably securing the clamping bracket to the slide, and threaded means for tightening the clamping bracket around the tool holder sleeve.

2. The clamping mechanism of claim 1 wherein said clamping bracket comprises a plurality of circumferentially consecutive bracket parts.

3. The clamping mechanism of claim 2 wherein the threaded means includes an internal thread on at least a first bracket part and a correspondingly threaded connector rotatably mounted to a second bracket part and matingly extending into the internal thread on the first bracket part.

4. The clamping mechanism of claim 1 wherein the means for detachably securing the clamping bracket to the slide includes a projection extending from one side of the slide and a hook formed in at least one end of the clamping bracket, said hook engaging the projection.

5. The clamping mechanism of claim 1 wherein the means for detachably securing the clamping bracket to the slide and the threaded means for tightening the clamping bracket around the tool holder sleeve comprise at least one internal thread in the slide and a threaded connector rotatably mounted to the clamping bracket and matingly extending from the clamping bracket into the internal thread on the slide.

6. The clamping mechanism of claim 1 wherein the clamping bracket has an inner contour being adapted to the outer cylindrical contour of the tool holder sleeve.

7. The clamping mechanism of claim 1 wherein the clamping bracket has a flexible tension strap.

8. The clamping mechanism of claim 1 wherein the clamping bracket has a rigid bracket member forming part of a circular ring.

* * * * *